US012255031B2

(12) United States Patent
Pritscher et al.

(10) Patent No.: US 12,255,031 B2
(45) Date of Patent: Mar. 18, 2025

(54) SWITCHING DEVICE HAVING AN ACTUATION UNIT, ON-BOARD ELECTRICAL SYSTEM AND MOTOR VEHICLE

(71) Applicant: Bayerische Motoren Werke Aktiengesellschaft, Munich (DE)

(72) Inventors: Florian Pritscher, Landshut (DE); Ingo Scherer, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 136 days.

(21) Appl. No.: 17/923,119

(22) PCT Filed: Jun. 14, 2021

(86) PCT No.: PCT/EP2021/065885
§ 371 (c)(1),
(2) Date: Nov. 3, 2022

(87) PCT Pub. No.: WO2022/008166
PCT Pub. Date: Jan. 13, 2022

(65) Prior Publication Data
US 2023/0178308 A1 Jun. 8, 2023

(30) Foreign Application Priority Data
Jul. 10, 2020 (DE) ..................... 10 2020 118 308.9

(51) Int. Cl.
*H01H 3/38* (2006.01)
*H01H 1/14* (2006.01)
*H01H 39/00* (2006.01)

(52) U.S. Cl.
CPC ................ *H01H 3/38* (2013.01); *H01H 1/14* (2013.01); *H01H 39/006* (2013.01)

(58) Field of Classification Search
CPC .......... H01H 3/38; H01H 1/14; H01H 39/006; H01H 89/00; H01H 2039/008; H01H 1/50; H01H 3/264; H01H 3/40; H01H 39/00
See application file for complete search history.

(56) References Cited

U.S. PATENT DOCUMENTS 8,476,996 B2 7/2013 Liang
10,153,709 B2 12/2018 Nagel et al.
(Continued)

FOREIGN PATENT DOCUMENTS

DE 10 2017 205 833 A1 10/2018
DE 10 2017 122 008 A1 3/2019
(Continued)

OTHER PUBLICATIONS

International Search Report (PCT/ISA/210) issued in PCT Application No. PCT/EP2021/065885 dated Sep. 30, 2021 with English translation (five (5) pages).
(Continued)

*Primary Examiner* — Lheiren Mae A Caroc
(74) *Attorney, Agent, or Firm* — Crowell & Moring LLP

(57) ABSTRACT

A switching device for an on-board electrical system of an electrically driven motor vehicle includes an electromechanical switch which is designed to connect and interrupt a supply line of the on-board electrical system. The electromechanical switch has: a stationary first switching contact, a movable second switching contact, and an actuation unit which has a mechanical force-transmitting element and a drive element. In order to switch from an open switching state to a closed switching state of the electromechanical switch, the drive element moves the transmitting element along a movement path, and the force-transmitting element moved along the movement path acts mechanically on the second switching contact and moves the second switching
(Continued)

contact toward the first switching contact. In order to maintain the closed switching state of the electromechanical switch, the force-transmitting element applies, at the end of the movement path, a pressing force to the second switching contact for pressing against the first switching contact, without further driving by way of the drive element.

10 Claims, 1 Drawing Sheet

(56) References Cited

U.S. PATENT DOCUMENTS

| | | | |
|---|---|---|---|
| 2015/0042426 A1 | 2/2015 | Ignatov et al. | |
| 2020/0075277 A1 * | 3/2020 | McTigue | H01H 71/02 |
| 2020/0203106 A1 | 6/2020 | Duensbier et al. | |
| 2020/0227220 A1 | 7/2020 | Oehler et al. | |
| 2024/0096578 A1 * | 3/2024 | Loeffelbein | H01H 39/00 |

FOREIGN PATENT DOCUMENTS

| | | |
|---|---|---|
| DE | 10 2018 103 103 A1 | 8/2019 |
| DE | 10 2018 222 466 A1 | 6/2020 |
| WO | WO 2014/005611 A1 | 1/2014 |

OTHER PUBLICATIONS

German-language Written Opinion (PCT/ISA/237) issued in PCT Application No. PCT/EP2021/065885 dated Sep. 30, 2021 (six (6) pages).

German-language Search Report issued in German Application No. 10 2020 118 308.9 dated Mar. 11, 2021 with partial English translation (11 pages).

* cited by examiner

SWITCHING DEVICE HAVING AN ACTUATION UNIT, ON-BOARD ELECTRICAL SYSTEM AND MOTOR VEHICLE

BACKGROUND AND SUMMARY

The invention relates to a switching device for an on-board electrical system of an electrically drivable motor vehicle. The invention also relates to an on-board electrical system and to a motor vehicle.

The present invention is directed at on-board electrical systems, in particular high-voltage on-board electrical systems, for electrically drivable motor vehicles. Such on-board electrical systems have on-board electrical system components, for example electric motors, air conditioning systems, headlights, energy storage units, etc., which are electrically connected to one another via supply lines. In the event of a defect or fault in an on-board electrical system component, a fault current in the form of an overcurrent may flow via the associated supply line and may further damage the supply line of the defective on-board electrical system component and the defective on-board electrical system component itself.

It is therefore known from the prior art to use switching devices that can trip in the presence of the overcurrent and disconnect the defective on-board electrical system component from the on-board electrical system. Such switching devices can include relays or contactors as well as fuses. The focus in the design of the contactors or relays is usually on a high disconnection capacity, not on a high current-carrying capacity, since the interaction between the contactor or relay and the fuse must result in an interruption-free disconnection characteristic.

It is the object of the present invention to provide a switching device for an on-board electrical system of a motor vehicle, which has a high current-carrying capacity in a closed state of the switching device.

This object is achieved in accordance with the invention by a switching device, an on-board electrical system and a motor vehicle having the features according to the various independent claims. Advantageous embodiments of the invention are the subject of the dependent claims, the description, and the figures.

A switching device according to the invention for an on-board electrical system of an electrically drivable motor vehicle comprises an electromechanical switch which is configured to connect and interrupt a supply line of the on-board electrical system. The electromechanical switch has a stationary first switching contact, a movable second switching contact, and an actuation unit which has a mechanical force-transmitting element and a drive element. To transfer from an open switching state to a closed switching state of the electromechanical switch, the drive element is configured to move the force-transmitting element along a movement path. The force-transmitting element moved along the movement path is configured to act mechanically on the second switching contact and to move it toward the first switching contact. To maintain the closed switching state of the electromechanical switch, the force-transmitting element is configured to apply, at the end of the movement path, a pressing force to the second switching contact for pressing against the first switching contact, without further driving by the drive element.

The invention also relates to an on-board electrical system for a motor vehicle having at least two on-board electrical system components, having at least one supply line electrically connecting the on-board electrical system components, and having at least one switching device according to the invention. The on-board electrical system is in particular a high-voltage on-board electrical system and has a plurality of on-board electrical system components, for example an energy storage device, an electric motor, an inverter, etc. The switching device is arranged in the associated supply line for galvanic isolation of the on-board electrical system components in the event of a fault. Away from the fault, the switching device is configured to conduct a current between the on-board electrical system components.

The first stationary or immovable switching contact, the second movable switching contact and the actuation unit form the electromechanical switch. The electromechanical switch is actuated or switched by means of the actuation unit. To switch the switch on or to close it, i.e. to transfer it from the open to the closed switching state, the actuation unit acts mechanically on the second switching contact. It moves or displaces it in the direction of the first switching contact until the first switching contact is pressed or pushed against the second switching contact. The actuation unit comprises here the force-transmitting element and the drive element. The drive element provides drive energy for the force-transmitting element, which is then moved along the movement path or travel path and transmits this movement to the second switching contact. The force-transmitting element driven by the drive element thus moves the second switching contact in the direction of the first switching contact in order to close the electromechanical switch. In so doing, the force-transmitting element exerts the pressing force on the second switching contact. The mechanical drive advantageously achieves a much higher pressing force here, so that contact resistance of the switching contacts is significantly reduced. As a result, a high current-carrying capacity and reduced heat generation at the switching contacts can be achieved compared to conventional relays or contactors. An orientation direction of the movement path can be oriented here along or parallel to a direction of movement of the second switching contact. The orientation direction of the movement path can also be oriented transversely, for example perpendicularly or obliquely, to the direction of movement of the second switching contact.

Even when the switch is in the closed switching state, the force-transmitting element provides the pressing force by means of which the second switching contact is pressed against the first switching contact. The pressing force is also provided by the force-transmitting element when no more drive energy is provided by the drive element. The closed switching state of the switch, in which the second switching contact is pressed against the first switching contact by the force-transmitting element, is thus maintained virtually without energy. In the closed switching state, a fixed mechanical connection is thus advantageously created between the switching contacts, which no longer requires a permanent energy supply after closing.

In a further development of the invention, to transfer the electromechanical switch from the closed switching state into the open switching state, the drive element is configured to move the force-transmitting element counter to the movement path so that the force-transmitting element no longer exerts a pressing force on the second switching contact. The second switching contact is connected to a spring element which is configured to move the second switching contact away from the first switching contact during the movement of the force-transmitting element against the movement path and to hold it in the moved-away state to maintain the open switching state. Thus, to release the switching contacts from each other again for opening the switch, the force-transmitting element is moved by the drive element against the movement path. As a result, the force-transmitting element no longer exerts a pressing force on the second switching contact. Since this second switching contact is connected to the spring element, the spring force of which acts against the pressing force, the second switching contact is removed from the first switching contact by the spring element. This opens the switch, which remains in the open state until the drive element moves the force-transmitting element along the movement path again.

Preferably, the spring element is formed by an elastic busbar which is electrically and mechanically connected to the second switching contact. Such an elastic, flexible busbar can, for example, be formed by a layered stack of thin, electrically conductive sheets. This busbar is electrically connected to the supply line.

It has proven to be advantageous if the switching device additionally has a pyrotechnical disconnection unit, which is configured to interrupt the supply line in the event of a fault. This embodiment is based on the finding that the electromechanical switch is optimized for current-carrying capacity and robustness, but not for fast disconnection capability. This fast disconnection capability to interrupt the supply line can be achieved by the pyrotechnic disconnection unit. Such pyrotechnic disconnection units have an ignition means which can be ignited by means of an energy pulse and thereby interrupts the supply line in a short space of time. Such a pyrotechnical disconnection unit has the advantage that it can ensure safe disconnection in the complete current range. Therefore, an optimization of the electromechanical switch for current carrying capacity and robustness is possible.

In one embodiment of the invention, the force-transmitting element comprises a threaded spindle which is linearly displaceable along the movement path by a drive element which is, for example, configured as an electric motor. In particular, the threaded spindle is oriented substantially perpendicular to a surface of the second switching contact, so that the threaded spindle moved along the movement path is configured to act substantially perpendicular to the surface and to push the second switching contact substantially parallel to the movement path in the direction of the first switching contact. Thus, the force-transmitting element and the drive element form a threaded rod drive. The drive element sets the threaded spindle, which can be guided within a spindle nut, in a rotational pushing motion, which converts the threaded spindle into a translational motion of the second switching contact in the direction of the first switching contact. The second switching contact is thus pushed by the threaded spindle in the direction of the first switching contact, wherein the orientation direction of the movement path is oriented in particular parallel to the pushing movement of the second switching contact. The threaded spindle can lift the second switching contact, for example, and thus move it toward the first switching contact.

In a further embodiment, the force-transmitting element has a push rod which is displaceable by the drive element. In particular, the push rod is oriented obliquely to a surface of the second switching contact, so that the push rod moved along the movement path is configured to slide over the surface of the second switching contact and to press the second switching contact obliquely to the movement path in the direction of the first switching contact. The first and second switching contacts are thus oriented at an angle to each other in the open switching state. The push rod is pushed over the surface of the second switching contact by the drive element, wherein a pressure is exerted on the second switching contact in the direction of the first switching contact. As a result, the second switching contact is pressed or pushed in the direction of the second switching contact. The push rod is driven in particular by a drive element in the form of a linear drive.

The invention also relates to an electrically drivable motor vehicle with an on-board electrical system according to the invention. The motor vehicle formed as a hybrid vehicle or electric vehicle is in particular formed as a passenger car.

The embodiments presented with reference to the switching device according to the invention and their advantages apply accordingly to the on-board electrical system according to the invention and to the motor vehicle according to the invention.

Further features of the invention will become clear from the claims, the figures, and the figure description. The features and combinations of features mentioned above in the description, as well as the features and combinations of features mentioned below in the figure description and/or shown alone in the figures, can be used not only in the combination indicated in each case, but also in other combinations or on their own.

The invention will now be explained in greater detail with reference to a preferred exemplary embodiment and with reference to the drawings.

BRIEF DESCRIPTION OF THE DRAWINGS

In the figures, like and functionally like elements have been provided with the same reference signs.

DETAILED DESCRIPTION OF THE DRAWINGS

Figure 1:
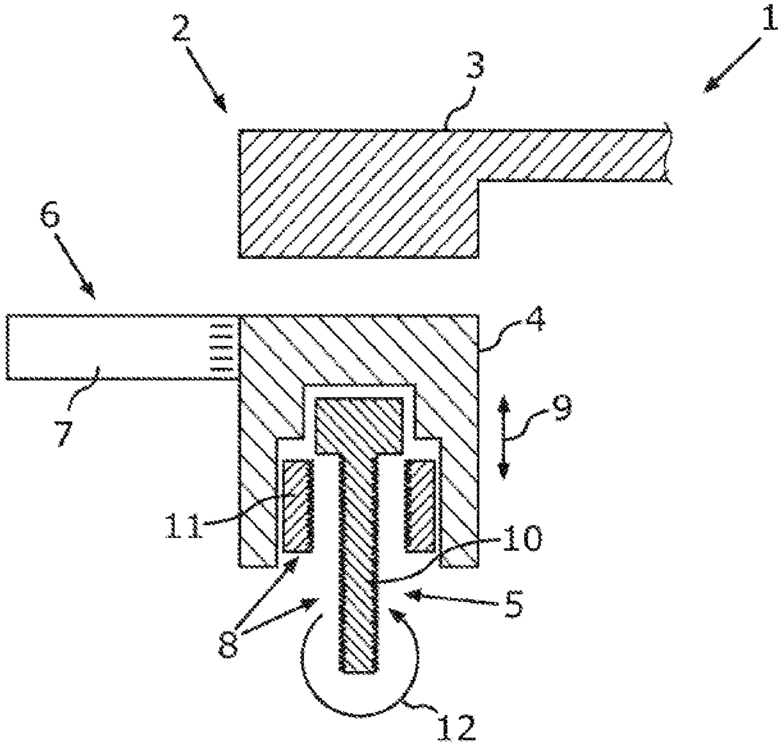
FIG. 1 is a schematic representation of a first embodiment of a switching device for an on-board electrical system.
Figure 2:
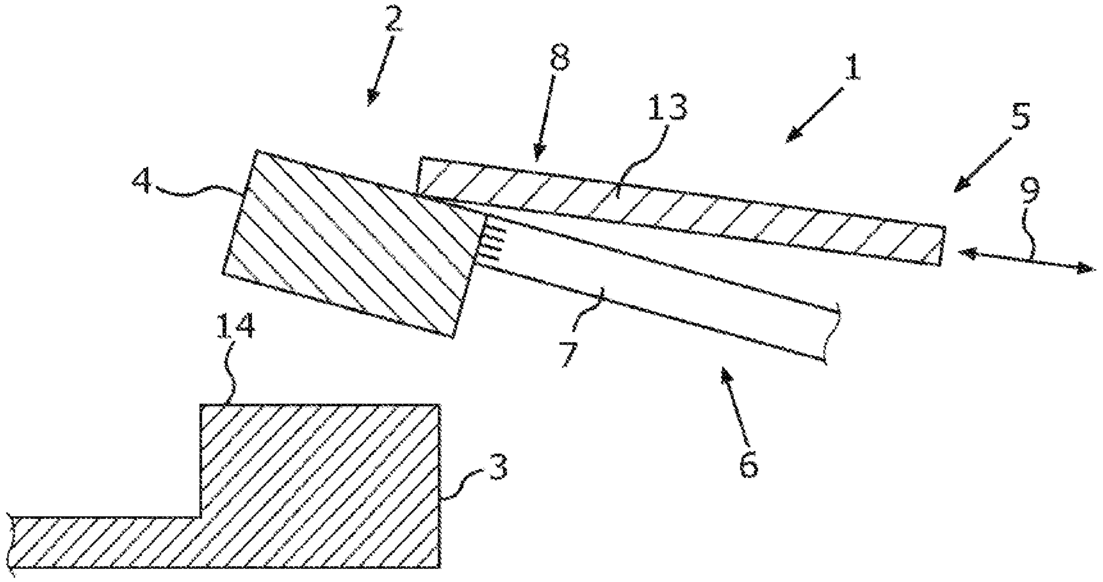
FIG. 2 is a schematic representation of a second embodiment of the switching device.

FIG. 1 and FIG. 2 show different embodiments of a switching device 1 for an on-board electrical system of an electrified motor vehicle. The switching device 1 is configured to switch off a supply line of the on-board electrical system away from a fault and to interrupt it in the event of a fault. For this purpose, the switching device 1 has an electromechanical switch 2, which has a first, stationary switching contact 3, a second switching contact 4, which can move with respect to the first switching contact 3, and an actuation unit 5. The second switching contact 4 is electrically and mechanically connected here to a spring element 6 in the form of a spring-elastic busbar 7 and is thus spring-elastically mounted. The busbar 7 is in turn electrically connected to the supply line of the on-board electrical system.

To transfer the switch 2 from the open switching state shown here to a closed switching state in which the switch 2 carries a current and connects the supply line, the actuation unit 5 moves the second switching contact 4 to the first switching contact 3 and exerts a pressing force on the second switching contact 4. This pressing force presses or pushes the second switching contact 4 against the first switching contact 3, so that the switch 2 has a particularly low contact resistance in the closed switching state. For this purpose, the actuation unit 5 has a force-transmitting element 8 which can be driven by a drive element, not shown here. By driving the force-transmitting element 8, the latter is displaceable or movable along a movement path 9. The force-transmitting element 8 transmits its movement against a spring force of the spring element 6 to the second switching contact 4, which is then moved in the direction of the first switching contact 3 until the switching contacts 3, 4 touch each other. This pressed-on state of the switching contacts 3, 4 is maintained by the force-transmitting element 8 even when the drive element no longer drives the force-transmitting element 8.

During the closed state of the switch 2, the pressing force exceeds the spring force and the second switching contact 4 is pressed against the first switching contact 3. To open the switch 2, the switching contacts 3, 4 are released or separated from each other again. To release the switching contacts 3, 4, the force-transmitting element 8 is again moved against the movement path 9. As a result, the spring force exceeds the pressing force of the force-transmitting element 8 on the second switching contact 4, so that the latter is removed from the first switching contact 3 by the spring element 6.

In the embodiment of the switching device 1 according to FIG. 1, the force-transmitting element 8 has a threaded spindle 10 and a spindle nut 11. The threaded spindle 10 is set into a rotary lifting motion 12 by the drive element, for example an electric motor, by which the threaded spindle 10 and thus the second switching contact 4 can be moved up and down. A direction of orientation of the movement path 9 is oriented here parallel to a direction of movement of the second switching contact 4. Thus, to close the switch 2, the threaded spindle 10 is moved upward here. As a result, the threaded spindle 10 pushes the second switching contact 4 upward in the direction of the first switching contact 3.

In the embodiment of the switching device 1 according to FIG. 2, the force-transmitting element 8 has a push rod 13, which is pushed over a surface 14 of the second switching contact 4, here to the left. As a result, the second switching contact 4 is pressed downward here in the direction of the first switching contact 3. The direction of orientation of the movement path 9 is here oriented obliquely to the direction of movement of the second switching contact 4. To open the switch 2, the push rod 13 is shifted against the movement path 9, in this case to the right. This allows the second switching contact 4 to release from the first switching contact 3 again.

The invention claimed is:

1. A switching device for an on-board electrical system of an electrically drivable motor vehicle, comprising:

an electromechanical switch which is configured to connect and interrupt a supply line of the on-board electrical system, wherein the electromechanical switch comprises:

a stationary first switching contact, a movable second switching contact, and an actuation unit which has a mechanical force-transmitting element and a drive element, wherein to transfer from an open switching state to a closed switching state of the electromechanical switch, the drive element is configured to apply a driving force to the force transmitting element to move the force-transmitting element along a movement path, and the force-transmitting element moved along the movement path is configured to act mechanically on the second switching contact and to move the second switching contact toward the first switching contact, and to maintain the closed switching state of the electromechanical switch, the force-transmitting element is configured to apply, at an end of the movement path, a pressing force to the second switching contact for pressing against the first switching contact, without continuing to apply the driving force via the drive element.

2. The switching device according to claim 1, further comprising:

a spring element, wherein to transfer the electromechanical switch from the closed switching state to the open switching state, the drive element is configured to move the force-transmitting element counter to the movement path in order to remove the pressing force from the second switching contact, wherein the second switching contact is connected to the spring element which is configured to move the second switching contact away from the first switching contact during the movement of the force-transmitting element counter to the movement path and to hold the second switching contact in a moved-away state to maintain the open switching state.

3. The switching device according to claim 2, wherein the spring element is an elastic busbar which is electrically and mechanically connected to the second switching contact.

4. The switching device according to claim 1, wherein the force-transmitting element has a threaded spindle which is linearly displaceable along the movement path by the drive element.

5. The switching device according to claim 4, wherein the threaded spindle is oriented substantially perpendicular to a surface of the second switching contact, so that the threaded spindle moved along the movement path is configured to act substantially perpendicular to the surface and to push the second switching contact substantially parallel to an orientation direction of the movement path in a direction of the first switching contact.

6. The switching device according to claim 1, wherein the force-transmitting element has a push rod which is displaceable by the drive element.

7. The switching device according to claim 6, wherein the push rod is oriented obliquely to a surface of the second switching contact, so that the push rod moved along the movement path is configured to slide over the surface of the second switching contact and to push the second switching contact obliquely to an orientation direction of the movement path in a direction of the first switching contact.

8. An on-board electrical system for a motor vehicle, comprising:

at least two on-board electrical system components;

at least one supply line electrically connecting the at least two on-board electrical system components; and at least one switching device comprising an electromechanical switch which is configured to connect and interrupt the at least one supply line, wherein the electromechanical switch comprises:

a stationary first switching contact, a movable second switching contact, an actuation unit which has a mechanical force-transmitting element and a drive element, wherein to transfer from an open switching state to a closed switching state of the electromechanical switch, the drive element is configured to move the force-transmitting element along a movement path, and the force-transmitting element moved along the movement path is configured to act mechanically on the second switching contact and to move the second switching contact toward the first switching contact, and to maintain the closed switching state of the electromechanical switch, the force-transmitting element is configured to apply, at an end of the movement path, a pressing force to the second switching contact for pressing against the first switching contact, without further driving via the drive element, wherein the switching device further comprises a spring element comprising an elastic busbar which is electrically and mechanically connected to the second switching contact, wherein the second switching contact is connected to the spring element which is configured to move the second switching contact away from the first switching contact during a movement of the force-transmitting element counter to the movement path and to hold the second switching contact in a moved-away state to maintain the open switching state.

9. An electrically drivable motor vehicle comprising an on-board electrical system according to claim 8.

10. A switching device for an on-board electrical system of an electrically drivable motor vehicle, comprising:

an electromechanical switch which is configured to connect and interrupt a supply line of the on-board electrical system, wherein the electromechanical switch comprises:

a stationary first switching contact, a movable second switching contact, and an actuation unit which has a mechanical force-transmitting element and a drive element, wherein to transfer from an open switching state to a closed switching state of the electromechanical switch, the drive element is configured to move the force-transmitting element along a movement path, and the force-transmitting element moved along the movement path is configured to act mechanically on the second switching contact and to move the second switching contact toward the first switching contact, and to maintain the closed switching state of the electromechanical switch, the force-transmitting element is configured to apply, at an end of the movement path, a pressing force to the second switching contact for pressing against the first switching contact, without further driving via the drive element, wherein the force-transmitting element has a push rod which is displaceable by the drive element, and wherein the push rod is oriented obliquely to a surface of the second switching contact, so that the push rod moved along the movement path is configured to slide over the surface of the second switching contact and to push the second switching contact obliquely to an orientation direction of the movement path in a direction of the first switching contact.

* * * * *